(12) United States Patent
Hungerford et al.

(10) Patent No.: US 9,719,526 B2
(45) Date of Patent: Aug. 1, 2017

(54) VERTICAL COOLER WITH LIQUID REMOVAL AND MIST ELIMINATOR

(71) Applicant: Oxea Corporation, Dallas, TX (US)

(72) Inventors: Chessley Alan Hungerford, Southington, CT (US); Mark Henry Sprow, Bay City, TX (US)

(73) Assignee: OXEA CORPORATION, Dallas, TX (US)

( * ) Notice: Subject to any disclaimer, the term of this patent is extended or adjusted under 35 U.S.C. 154(b) by 340 days.

(21) Appl. No.: 14/400,462

(22) PCT Filed: May 23, 2013

(86) PCT No.: PCT/US2013/042334
§ 371 (c)(1),
(2) Date: Nov. 11, 2014

(87) PCT Pub. No.: WO2013/184367
PCT Pub. Date: Dec. 12, 2013

(65) Prior Publication Data
US 2015/0125314 A1 May 7, 2015

Related U.S. Application Data

(60) Provisional application No. 61/657,074, filed on Jun. 8, 2012.

(51) Int. Cl.
*F04D 23/00* (2006.01)
*F04D 29/58* (2006.01)
*B01D 53/26* (2006.01)
*B01D 53/00* (2006.01)
*F04D 29/70* (2006.01)

(52) U.S. Cl.
CPC ....... *F04D 29/5833* (2013.01); *B01D 53/002* (2013.01); *B01D 53/265* (2013.01); *F04D 23/001* (2013.01); *F04D 29/706* (2013.01); *B01D 2256/16* (2013.01); *B01D 2257/80* (2013.01)

(58) Field of Classification Search
CPC .......... F04B 39/06; F04B 39/16; F04D 17/12; F04D 29/5826; F04D 29/5833
USPC .......................... 417/243, 244; 162/121, 122
See application file for complete search history.

(56) References Cited

U.S. PATENT DOCUMENTS

| 4,087,197 A | * | 5/1978 | Haugen | F04D 25/163 |
|---|---|---|---|---|
| | | | | 415/169.2 |
| 5,173,041 A | * | 12/1992 | Niimura | F04C 23/001 |
| | | | | 417/313 |
| 6,139,747 A | | 10/2000 | Rötzheim et al. | |

(Continued)

FOREIGN PATENT DOCUMENTS

WO 2010081526 A1 7/2010

OTHER PUBLICATIONS

Kirk-Othmer, Encyclopedia of Chemical Technology, 3rd ed., 1981, p. 389, vol. 14, Wiley.

*Primary Examiner* — Patrick Hamo
(74) *Attorney, Agent, or Firm* — Michael W. Ferrell

(57) ABSTRACT

A vertical gas cooler suitable for use as an intercooler in a multi-stage compressor includes an inlet at its upper portion, a tube bundle, a centrally disposed mist eliminator assembly and a side-draw outlet. Optionally provided is a drain pipe from the mist eliminator assembly to a sump located below the side-draw outlet.

15 Claims, 1 Drawing Sheet

(56) References Cited

U.S. PATENT DOCUMENTS

| | | | | |
|---|---|---|---|---|
| 6,276,902 B1* | 8/2001 | Charron | ............... | F04D 31/00 |
| | | | | 417/244 |
| 2008/0008602 A1* | 1/2008 | Pozivil | ................ | F28F 27/02 |
| | | | | 417/243 |
| 2009/0025399 A1* | 1/2009 | Kamen | ................ | B01D 1/02 |
| | | | | 62/6 |
| 2011/0315349 A1* | 12/2011 | Pinatti | ................ | C09C 1/482 |
| | | | | 165/104.21 |
| 2015/0184872 A1* | 7/2015 | Oh | ......................... | F24F 1/56 |
| | | | | 165/122 |

* cited by examiner

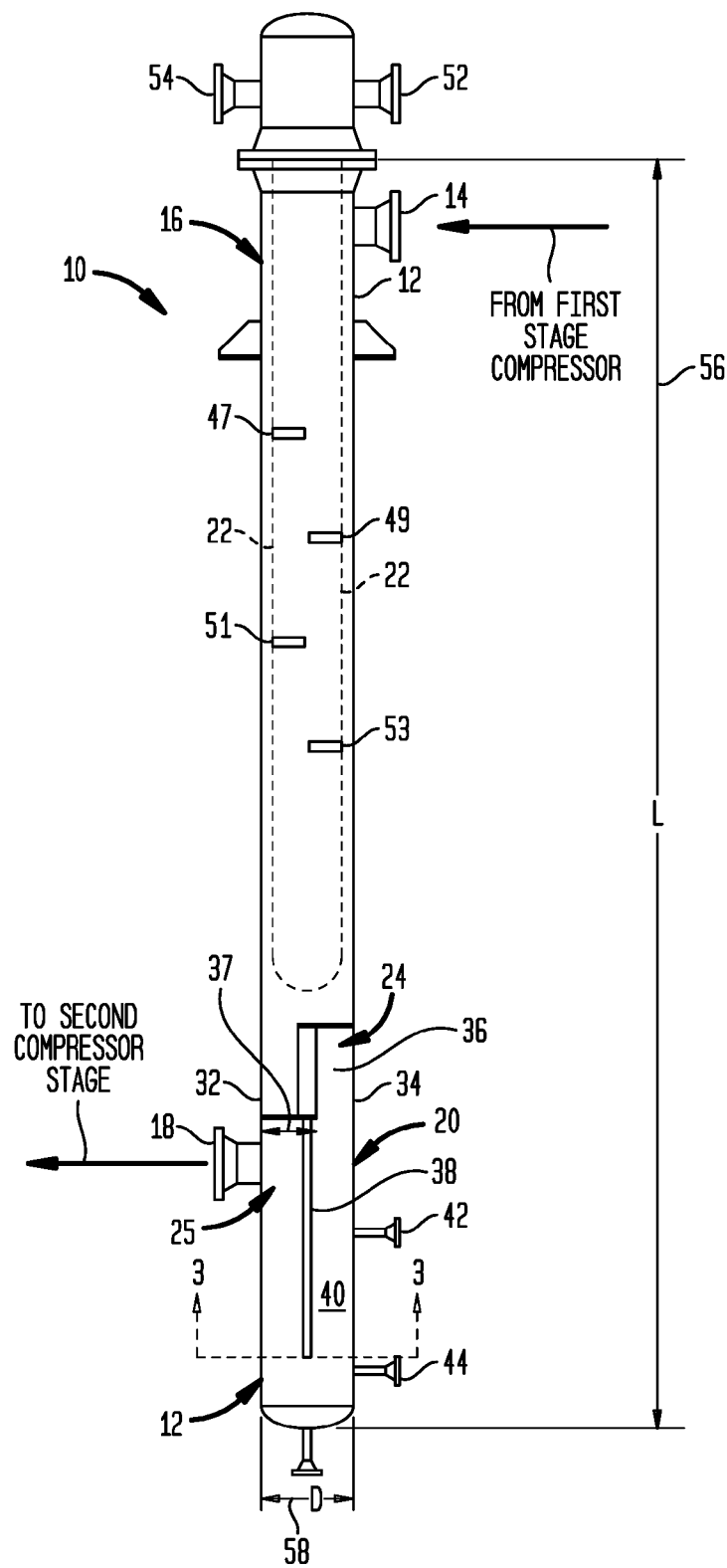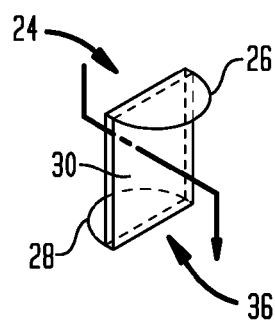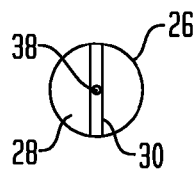

VERTICAL COOLER WITH LIQUID REMOVAL AND MIST ELIMINATOR

CLAIM FOR PRIORITY

This application is based on International Application No. PCT/US2013/042334, filed May 23, 2013, which was based on U.S. Provisional Patent Application No. 61/657,074, filed Jun. 8, 2012. The priorities of International Application No. PCT/US2013/042334 and U.S. Provisional Patent Application No. 61/657,074 are hereby claimed and their disclosures incorporated herein by reference.

TECHNICAL FIELD

The present invention relates generally to coolers with liquid and mist removal. The device is particularly useful as an intercooler for a multi-stage compressor.

BACKGROUND ART

Conventionally, a gas cooler and mist eliminator are provided in separate vessels which adds bulk and introduces pressure drop into a system due to gas exiting and entering the various units. Such configuration is disclosed, for example, in United States Patent Application Publication No. U.S. 2008/0008602 of Pozivil et al.; note FIG. 6 thereof.

Conventional mist removal systems include particulate and/or fibrous coalescers as is seen in Kirk-Othmer, *Encyclopedia of Chemical Technology*, 3$^{rd}$ ed., Vol. 14, page 389 (Wiley 1981). The use of coalescing filters is also described in U.S. Pat. No. 6,139,747 to Rotzheim et al., which refers to the removal of organic impurities in the course of wastewater treatment in connection with an aldolization process.

WO 2010/081526 discloses treating exhaust gas through a coalescing filter to remove water and other impurities.

U.S. Pat. No. 4,087,197 to Haugen discloses a multi-stage compressor with a horizontal intercooler provided with a mist eliminator pad 86 in FIG. 3. In this system, it appears difficult to drain off condensed liquid effectively. Moreover, liquid accumulating on a mist eliminator pad disengages as large droplets in a gas stream and the droplets are entrained in flowing gas and propelled downstream, causing damage to components such as pump impellers. In this regard, the system disclosed in the '197 patent may be undesirable in manufacturing operations with extended manufacturing campaigns between turn-arounds because impeller wear is detrimental to performance and requires expensive and time consuming maintenance.

SUMMARY OF INVENTION

There is provided in accordance with the present invention a vertical cooler with liquid removal and a mist eliminator configured such that the cooled gas is taken as side-draw in order to avoid entrained droplets in the gas stream as it exits the device. In a preferred construction, there is provided a tortuous flow path between the mist eliminator assembly and a side-draw exit over a disengaging space defined by the intercooler housing.

Further features and advantages will become apparent from the discussion which follows.

BRIEF DESCRIPTION OF DRAWINGS

The invention is described in detail below with reference to the drawings, wherein like numerals designate similar parts. In the drawings:

FIG. 1 is a schematic view in elevation and section illustrating construction and operation of a vertical cooler with liquid removal and mist eliminator in accordance with the invention;

FIG. 2 is a view in perspective illustrating construction of a mist eliminator assembly disposed in the housing of the device of FIG. 1; and FIG. 3 is a bottom sectional view along line 3-3 of FIG. 1 further illustrating construction of the mist eliminator assembly, especially the drain pipe of the cooler's mist eliminator assembly.

DETAILED DESCRIPTION

The invention is described in detail below in connection with the Figures for purposes of illustration, only. The invention is defined in the appended claims.

As used herein, terminology is given its ordinary meaning as supplemented by the following discussion.

"Mist eliminator medium" or like terminology refers to any conventional porous material used to coalesce and remove mist from a gas including particulate containing cartridges, fibrous composites and so forth. Particularly preferred are fine metal mesh, co-knit metal and glass mesh or combinations of such materials.

Unless otherwise indicated, "orientation" generally refers to the direction perpendicular to a cross section of a part or assembly and refers to direction when referring to flow of a fluid. The orientation of a tube, for example, is the direction along its axis and the orientation of flow though an outlet, for example, is usually substantially perpendicular to the outlet.

"Vertically oriented" and like terminology used throughout this description and claims refers to construction and placement of the inventive device for flow generally perpendicular to the plane of the horizon; that is, a generally upright orientation as opposed to a generally horizontal orientation. Vertical orientation thus refers to having the inlet and outlet of the device at different levels and preferably having the outlet of the cooler at a level of the device below the inlet. While the device is illustrated in orientation 90° from horizontal, one of skill in the art will appreciate that the device of FIG. 1 might be substantially inclined from that position without changing its mode of operation or that the device is configured for vertically oriented flow.

Referring to FIG. 1, there is illustrated schematically in elevation and section a vertical cooler 10 with an elongated vertical oriented housing 12 provided with an inlet 14 at its upper portion indicated generally at 16 and a side-draw outlet 18 at its lower portion indicated generally at 20.

A plurality of cooling tubes 22 are secured with housing 12 adjacent upper portion 16 of the housing; while a mist eliminator assembly 24 is located within housing 12 between tubes 22 and outlet 18. The housing further defines a disengaging space indicated generally at 25 between assembly 24 and side-draw outlet 18.

Referring to FIGS. 1 and 2, mist eliminator assembly 24 includes an upper baffle plate 26 and a lower baffle plate 28 which operate to position mist eliminator medium 30 generally centrally within the housing and define a tortuous flow pattern whereby flowing gas is directed from a first side 32 of the housing to a second side 34 of the housing upon exiting the mist eliminator medium. It will be appreciated from FIGS. 1 and 2 and the discussion hereinafter that assembly 24 is positioned, configured and dimensioned such that gas flowing through the device flows through mist eliminator assembly 24 and flows through mist eliminator medium 30. The baffle plates are disposed such that the side-draw outlet 18 is located on first side 32 of the housing, away from outlet 36 of assembly 24, at a level below lower baffle plate 28 and below the level of outlet 36 of mist eliminator assembly 24.

The disengaging space of the cooler is the portion of the interior of the device between outlet 36 of the mist eliminator assembly and outlet 18 of the cooler. The flow path involves a change in flow direction such as shown where outlet 36 of the mist eliminator assembly is oriented perpendicular to side-draw outlet 18 of the device. Most preferably, the side draw outlet is located on the opposite side of the housing from the side where the mist eliminator outlet is located, involving a horizontal disengaging distance 37 between outlet 36 of the mist eliminator assembly and draw outlet 18 of the device. Most preferably, distance 37 is at least 3-4 inches and preferably 6 inches or more. Any other suitable configuration which provides for allowing the momentum of entrained droplets to carry them away from the device outlet such as vertical acceleration distances of an inch or two before a change in flow direction is likewise suitable. The disengaging space of the device thus spans between an outlet of the mist eliminator assembly having a different orientation than the orientation of the outlet of the cooler and includes that portion of the interior of the device separating those respective outlets of differing orientation.

FIG. 3 is a view along line 3-3 of FIG. 1 illustrating placement of a drain pipe 38 which extends from mist eliminator medium 30 to a sump 40 where condensed liquid is accumulated after it is derived from medium 30 via pipe 38. The level of liquid in sump 40 is monitored via upper and lower ports 42, 44, which may include optical sensors or other sensors, if so desired. During operation, it is desirable to maintain some liquid in the sump to maintain pressure in cooler 10.

Various materials may be used to fabricate mist eliminator medium 30. Particularly preferred are fine metal mesh, co-knit metal and glass mesh or combinations of such materials. The cooling tubes are perhaps most preferably a U-tube bundle as is well known in the art and which may be provided with a plurality of baffle plates indicated at 47, 49, 51, 53. This baffled construction is likewise well known. Coolant is fed to the U-tube bundle via inlet 52 and exits at 54 during operation of the device.

The dimensions of the cooler/mist eliminator of the invention will vary depending upon its application. A length 56 to diameter 58 ratio is suitably from 5 to 30; typically, 8.5 to 20 and from 12.5 to 17.5 in many cases.

The vertical cooler with liquid removal and mist eliminator described and shown in FIGS. 1-3 is especially useful as an intercooler for a multi-stage compressor used for compressing hydrogen gas, for example. During use, the device is operated by way of circulating coolant via inlet 52, outlet 54 and feeding compressed gas from a first compressor stage to vertical gas intercooler 10 via inlet 14 at upper portion 16 of the device such that the gas stream contacts a plurality of cooling tubes 22 located adjacent the upper portion of the cooler housing 12. After cooling, the gas is fed downwardly to mist eliminator assembly 24 disposed between the cooling tubes and the side-draw outlet 18 of the housing, the mist eliminator assembly being positioned, configured and dimensioned such that gas flowing between the inlet and outlet of the housing flows through a mist eliminator medium 30. The housing further defines a disengaging space 25 between the mist eliminator element and side-draw outlet of the housing. During operation, the gas flows generally downwardly and is cooled which promotes condensation of liquid contained in the gas. Condensed liquid, typically water, is removed from the flowing gas by medium 30. Medium 30 is drained of condensed liquid by way of gravity flow through pipe 38 and accumulates in sump 40. A liquid level is maintained by monitoring liquid level in the sump at ports 42 and 44 and draining the sump periodically in response to those measurements so that a predetermined level of liquid in the sump prevents pressure loss during draining of the device under elevated pressure, that is, when the device is utilized between stages of a multi-stage compressor.

Any droplets of condensed liquid which are entrained from mist eliminator medium 30 are propelled downwardly from exit 36 of the mist eliminator assembly by the downwardly flowing gas, away from side-draw outlet 18.

Cooled gas is withdrawn from the cooler via outlet 18 and fed forward to another stage of a multi-stage compressor.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of intercooling gas between compressor stages in a multistage compressor comprising:
   (a) providing a gas intercooler (10) with liquid removal and mist eliminator, the intercooler including:
      (i) an elongated vertically oriented housing (12) provided with an inlet (14) at a first end portion (16) thereof and a side-draw outlet (18) at a second end portion (20) thereof on a first side (32) of said housing;
      (ii) a plurality of cooling tubes (22) located adjacent the first end portion (16) of the housing;
      (iii) a mist eliminator assembly (24) disposed between the cooling tubes (22) and the side-draw outlet (18) of the housing, the mist eliminator assembly (24) having a pair of spaced baffle plates including a first baffle plate (26) juxtaposed with a second side (34) of the housing and a second baffle plate (28) juxtaposed with said first side (32) of the housing which baffle plates position a mist eliminator medium (30) centrally therebetween within the housing and thereby define a tortuous serpentine channel extending sequentially from said first side (32) of the housing to the mist eliminator medium (30) to the second side of the housing (34) at an outlet (36) of the mist eliminator medium (30) and therefrom to the side draw outlet (18) on the first side (32) of the housing; and
      (iv) the housing (12) further defining a disengaging space (25) between the mist eliminator assembly outlet (36) and side-draw outlet (18) of the housing;
   (b) feeding compressed gas from a first compressor stage to the inlet (14) of the intercooler (10);
   (c) cooling the gas in the intercooler (10) and removing condensed liquid therefrom;

(d) withdrawing the cooled gas from the intercooler side draw outlet (18) and (e) feeding the withdrawn gas to a second compressor stage of a multistage compressor.

2. The method of intercooling gas between compressor stages in a multistage compressor according to claim 1, wherein the gas comprises hydrogen.

3. A gas cooler (10) with liquid removal and mist eliminator comprising:
   (a) an elongated housing (12) provided with an inlet (14) at a first end portion (16) thereof and a side-draw outlet (18) at a second end portion (20) thereof on a first side (32) of said housing;
   (b) a plurality of cooling tubes (22) located adjacent the first end portion (16) of the housing;
   (c) a mist eliminator assembly (24) disposed between the cooling tubes (22) and the side-draw outlet (18) of the housing, the mist eliminator assembly (24) having a pair of spaced baffle plates including a first baffle plate (26) juxtaposed with a second side (34) of the housing and a second baffle plate (28) juxtaposed with said first side (32) of the housing which baffle plates position a mist eliminator medium (30) centrally therebetween within the housing and thereby define a tortuous serpentine channel extending sequentially from said first side (32) of the housing to the mist eliminator medium (30) to the second side of the housing (34) at an outlet (36) of the mist eliminator medium (30) and therefrom to the side draw outlet (18) on the first side (32) of the housing; and
   (d) the housing (12) further defining a disengaging space (25) between the mist eliminator assembly outlet (36) and side-draw outlet (18) of the housing.

4. The gas cooler (10) with liquid removal and mist eliminator according to claim 3, wherein the disengaging space (25) extends over a distance (37) of at least 3-4 inches (75-100 mm) and preferably 6 inches (150 mm) or more.

5. The gas cooler (10) with liquid removal and mist eliminator according to claim 4, wherein the disengaging space (25) extends over a distance (37) of at least 6 inches (150 mm) or more.

6. The gas cooler (10) with liquid removal and mist eliminator according to claim 3, wherein the the first side of the housing (32) where the side draw outlet (18) is located is disposed opposite the second side of the housing (34) where the mist eliminator outlet (36) is located.

7. The gas cooler (10) with liquid removal and mist eliminator according to claim 3, wherein the mist eliminator assembly (30) includes a drain pipe (38).

8. The gas cooler (10) with liquid removal and mist eliminator according to claim 3, wherein the housing defines a sump (40) located outwardly with respect to the side-draw outlet (18) for collecting liquid removed from a cooled gas, and the sump includes a pair of sensor ports (40, 42) for monitoring liquid level in the sump.

9. The gas cooler (10) with liquid removal and mist eliminator according to claim 3, wherein the mist eliminator assembly includes a drain pipe and the drain pipe extends to a sump defined by the housing located outwardly with respect to the side-draw outlet.

10. The gas cooler (10) with liquid removal and mist eliminator according to claim 3, wherein the mist eliminator assembly includes a mist eliminator medium selected from metal mesh, co-knit metal and glass mesh and combinations thereof.

11. The gas cooler (10) with liquid removal and mist eliminator according to claim 3, wherein said plurality of cooling tubes (22) comprises a U-tube bundle.

12. The gas cooler (10) with liquid removal and mist eliminator according to claim 11, wherein the U-tube bundle is a baffled (47, 49, 51, 53) U-tube bundle.

13. The gas cooler (10) with liquid removal and mist eliminator according to claim 3, wherein the housing (12) has a length (56) to diameter (58) ratio of from about 5 to about 30.

14. The gas cooler (10) with liquid removal and mist eliminator according to claim 3, wherein the housing (12) has a length (56) to diameter (58) ratio of from about 8.5 to about 20.

15. The gas cooler (10) with liquid removal and mist eliminator according to claim 3, wherein the housing (12) has a length (56) to diameter (58) ratio of from about 12.5 to about 17.5.

* * * * *